March 9, 1926. 1,576,323
E. A. HELLSTRAND
MOTOR VEHICLE
Filed May 26, 1925
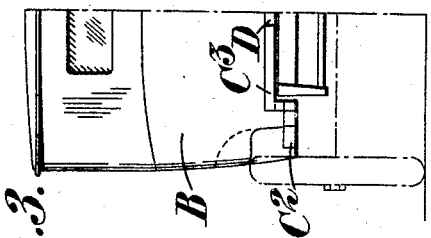
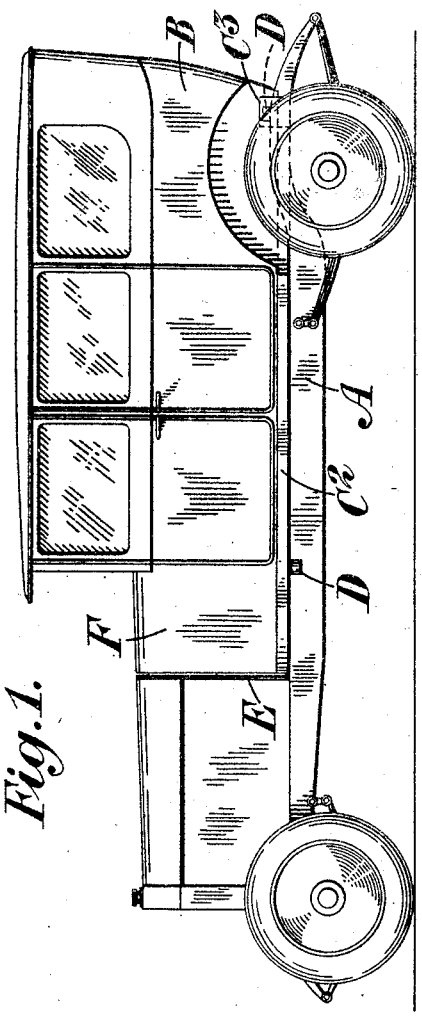
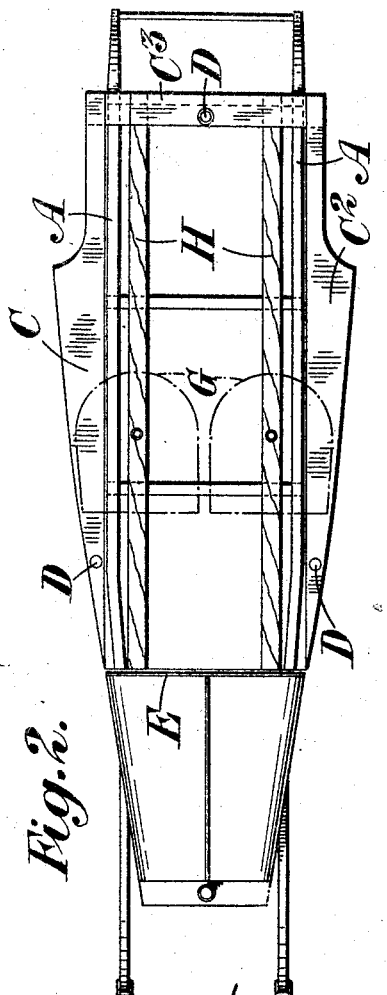
INVENTOR:
EDWARD A. HELLSTRAND
by Spear, Middleton, Donaldson & Hall
Attys.

Patented Mar. 9, 1926.

1,576,323

UNITED STATES PATENT OFFICE.

EDWARD AXELSON HELLSTRAND, OF GUILDFORD, ENGLAND.

MOTOR VEHICLE.

Application filed May 26, 1925. Serial No. 33,006.

*To all whom it may concern:*

Be it known that I, EDWARD AXELSON HELLSTRAND, a British subject, residing at Guildford, Surrey, England, have invented certain new and useful Improvements in Motor Vehicles, of which the following is a specification.

This invention relates to motor vehicles and it has for its object to provide improved and simplified interchangeable bodywork therefor.

Bodies for motor vehicles are frequently made easily detachable, so that an existing body can be comparatively quickly removed and another substituted, and in some cases the body is mounted upon a metal body frame which is detachably secured to the chassis frame. In such cases the work of removing and changing the bodies is difficult owing to the relatively considerable weight, and it is the object of the present invention to provide a construction overcoming these defects and enabling the interchangeable parts to be simpler and cheaper than is usual.

According to this invention, there are combined with the chassis frame detachable seats carried thereby and detachable and interchangeable body shells each adapted to be supported (preferably at three points) upon the chassis frame. Preferably each body shell is mounted upon a separate body frame.

As the shells do not carry the seats nor flooring, they are comparatively light and much easier to handle and change than usual, and they are rendered cheaper as the same flooring and seats suit different body shells.

The invention is particularly useful where for some months of the year a closed vehicle body is required, which is found objectionable in summer months, as a chauffeur can, single-handed and with simple tackle, remove and change the body shells.

In the accompanying drawings,

Figure 1 is a side elevation illustrating one method of carrying out this invention.

Figure 2 is a plan showing the body frame in position, with the body shell omitted, and Figure 3 is a half rear elevation of Figure 1.

Like letters indicate like parts throughout the drawings.

In the construction illustrated, the chassis is provided with the usual longitudinal frame members A which are supported by springs from the axles.

The body shell B is secured to a body frame comprising two longitudinal members C, C² and a transverse rear member C³, with or without any suitable number of other transverse members. The body frame is mounted upon the chassis frame at the three or more points D and any suitable connection may be adopted at these points such as to permit the desired relative movement as the chassis frame twists, in order to relieve the body frame of distortion. The connections also are preferably such that they can easily be broken when it is desired to change body shells. The body frame preferably has a clearance from the chassis frame and all parts of the chassis, so as to prevent noise when the chassis frame bends.

A typical closed body shell is indicated at B and its construction forms no part of the invention. The front of the shell is not attached to the dashboard E, but there is a clearance between the front of the scuttle F, which forms part of the body shell, and the dashboard, the clearance being closed by a draught-excluding flap of any suitable kind.

It will be clear that the body shell is relieved from distortional stresses and, therefore, can be very light, and that it and its body frame can easily be lifted from the chassis frame and replaced thereon. The body frame is the same, or similar, in shape for all kinds of body shell, so that any type of body shell can easily be fitted.

The seats, two of which are indicated at G, are preferably carried on longitudinal sills H supported upon the chassis frame, and they are preferably adjustable on these sills both in a longitudinal direction and for tilt. The flooring is also carried by the chassis frame or by the sills, and the flooring and sills remain attached to the chassis frame when the body shell and body frame are removed.

The seats are secured by any easily detachable fixing, but they are solely carried from the chassis frame. They preferably have a clearance from, or only lightly touch, the sides of the body shell, so that the latter receives no loading.

When a shell is to be removed, the seats are first disconnected from the chassis frame and removed, the three attachments at D broken, and the body shell lifted or drawn backwards, or both. Another body shell can be replaced by reversing this movement. An alternative to making the seats so that they can be lifted out bodily is to construct them so that they can be dismantled and the parts removed from inside the body shell.

By this means a very light and rigid interchangeable shell is produced whereby the bodywork can be removed and altered singlehanded.

I am aware that it has been proposed to construct motor-car bodies with a floor which carried the seats, being fixed to the chassis frame, whilst the body sides were quite independent thereof, but this did not incorporate the idea of employing interchangeable body shells with the same set of seats.

What I claim as my invention and desire to secure by Letters Patent is:—

In a motor vehicle the combination of a chassis frame, longitudinal sills mounted thereon, detachable seats carried solely thereby and out of contact with said chassis frame, and a detachable body shell, mounted upon its own supporting frame, said frame engaging the chassis at three points only, the remainder of the body shell supporting frame being spaced from said chassis frame.

In testimony whereof I have signed my name to this specification.

EDWARD AXELSON HELLSTRAND.